Figure 1:
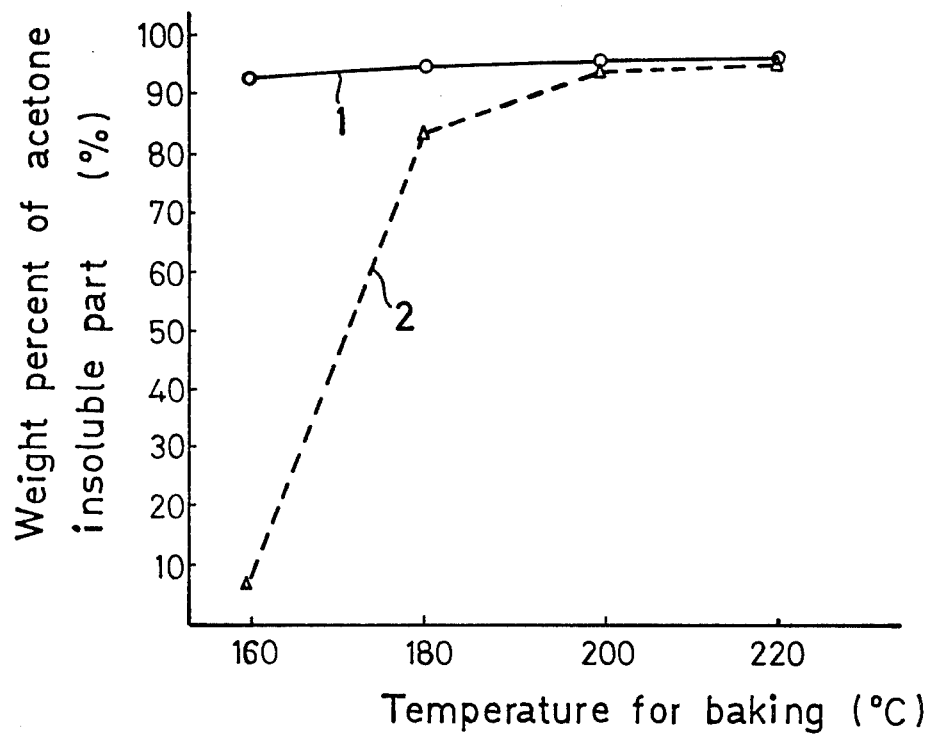

United States Patent [19]
Tsutsui et al.

[11] 4,093,674
[45] June 6, 1978

[54] POWDER COATING COMPOSITION

[75] Inventors: Koichi Tsutsui, Kyoto; Yoshio Eguchie, Ikeda, both of Japan

[73] Assignee: Nippon Paint Co., Ltd., Japan

[21] Appl. No.: 629,131

[22] Filed: Nov. 5, 1975

Related U.S. Application Data
[63] Continuation of Ser. No. 420,463, Nov. 30, 1973, abandoned.

[30] Foreign Application Priority Data

Nov. 30, 1972  Japan .................................. 47-120535

[51] Int. Cl.² .................... C08L 67/02; C08L 29/04; C08G 18/62; C08G 18/42
[52] U.S. Cl. ..................... 260/830 P; 260/22TN; 260/47 CB; 260/77.5 CR; 260/849; 260/858; 260/859 R; 260/860; 427/27; 427/185; 526/1; 526/5
[58] Field of Search ................. 260/830 P, 849, 858, 260/860, 859 R, 77.5 CR, 77.5 R

[56] References Cited

U.S. PATENT DOCUMENTS

| | | | |
|---|---|---|---|
| 3,240,842 | 3/1966 | Saunders | 260/858 |
| 3,409,461 | 11/1968 | Mehlo et al. | 117/100 |
| 3,560,447 | 2/1971 | Bingham | 260/77.5 |
| 3,620,680 | 11/1971 | Bartel et al. | 260/75 NE |
| 3,647,848 | 3/1972 | Wagner et al. | 260/858 |
| 3,663,472 | 5/1972 | Raymond | 260/6 |
| 3,676,405 | 7/1972 | Labana | 260/77.5 CR |
| 3,819,586 | 6/1974 | Rudolph et al. | 260/77.5 TB |
| 3,822,240 | 7/1974 | Schmitt et al. | 260/77.5 TB |
| 3,917,741 | 11/1975 | McGarr | 260/859 R |

OTHER PUBLICATIONS
Bikales – Encyclopedia Reprints: Extrusion and Other Plastics Operations, Wiley–Interscience, New York, 1971, p. 128.

*Primary Examiner*—H.S. Cockeram
*Attorney, Agent, or Firm*—Wenderoth, Lind & Ponack

[57] ABSTRACT

A powder coating composition which comprises at least one solid resin and at least one polyisocyanate compound having an average of at least two isocyanate groups per molecule, in a weight ratio of from 99 : 1 to 30 : 70 is provided. The composition has excellent storage stability and affords a coating film with excellent properties.

10 Claims, 2 Drawing Figures

POWDER COATING COMPOSITION

This is a continuation, of application Ser. No. 420,463, filed Nov. 30, 1973 and now abandoned.

The present invention relates to a powder coating composition excellent in storage stability which comprises a solid resin and a polyisocyanate compound having at least two isocyanate groups. When the said solid resin has an active hydrogen atom which can react with an isocyanate group such as the one in a hydroxyl group or in a primary or secondary amino group, the resulting powder coating composition is provided with a lower temperature thermosetting property and can afford a coating film excellent in the surface condition and various physical properties.

Recently, various attempts have been made to inhibit the evaporation of solvents from paint compositions into atmosphere for prevention of air pollution. Thus, there has been developed a powder coating process wherein a powder coating composition containing no volatile component or only a small amount of volatile component is applied by an electrostatic coating procedure, a fluidized bed coating procedure or the like. As the resin component in such powder coating composition, there have been used vinyl chloride resin, epoxy resin, thermosetting acrylic resin and the like. There have also been used thermosetting polyester resins, thermosetting acryl-modified polyester resins, urethane resins, thermoplastic acrylic resins, thermoplastic polyester resins, thermoplastic acrylic-modified polyester resins, etc. In the application, the powder coating composition is heated so that the resin component therein is melted to put it in a fluidized state whereby a continuous and smooth film is formed. Therefore, the formation of a coating film is much influenced by the thermal fluidity of the resin in the powder coating composition. Namely, a higher thermal fluidity of the resin can afford a better coating film. However, a higher fluidity of the resin generally produces marked sticking and blocking of the powder particles when stored for a long time or at a high temperature, and the use of the resin thus becomes practically impossible.

On the other hand, the utilization of an isocyanate cross linking type urethane resin which is excellent in weather resistance, chemical resistance and mechanical properties is highly desired. In fact, such resin has been widely used in solution type coating compositions. Due to the high reactivity of the isocyanate group, it is ordinarily used in a two component type; i.e. a paint slution and a cross linking agent are mixed together instantly before the use. Or, it is used in a one component type; i.e. all the isocyanate groups are previously blocked with a phenol or the like and, after applying and baking, the isocyanate groups are recovered so as to complete the cross linking.

A powder coating composition containing an isocyanate cross linking type urethane resin which is stable at an ordinary temperature is also obtainable in the same manner as above, i.e. by mixing a totally blocked isocyanate compound with a solid resin having an active hydrogen atom and powdering the mixture. For the formation of a cured coating film for such powder coating composition, it is necessary to heat the composition up to the dissociation temperature of the blocking agent. In case of tolylene diisocyanate blocked with phenol, the dissociation temperature is usually 180° C or more. In case of tolylene diisocyanate blocked with an alcohol, the dissociation temperature is usually 200° C or more. In order to assure a sufficient degree of cross linking, heating at a considerable temperature is thus needed. Further, the heat discharge of a blocking agent normally produces a peculiar odor causing environmental pollution and unfavorably imparts discoloration, pinhole formation and the like to the resulting film. Thus, the conventional heat processing gives a marked deterioration to the surface of the resulting coating film and displays a negative effect on the environment which should be contrary to the intended effect of a powdery coating process.

In order to overcoming the said incompatibility of thermal fluidity and storage stability as recognized in a conventional powder coating composition and the said defect as encountered when a totally blocked isocynate compound is used as a cross linking agent, extensive study has been made.

As the result, it has been found that powder particles obtained by dispersing a polyisocyanate compound having an isocyanate group into a solid resin hardly produce sticking or blocking during the storage for a long time or at a high temperature. It has also been found that the said polyisocyanate compound is so stable even when dispersed in a solid resin having an active hydrogen atom, that any material deterioration is not produced in the physical properties of the coating film formed by such composition. Since the said polyisocyanate compound has an extremely low vapor pressure, its toxicity is remarkably lessened, thus undoubtedly affording a great usefulness in industry. Moreover, a composition comprising the said solid resin having an active hydrogen atom and the said polyisocyanate compound need not be heated at such a high temperature as in the case of a conventional composition using a totally blocked isocyanate compound as a cross linking agent for dissociation of the blocking agent. Due to this advantage, a sufficient degree of cross linking can be attained at a lower temperature, and further, due to non-discharge of any blocking agent, the contamination of environment does not occur and the deterioration of the physical properties of the resulting coating film is not caused. The present invention is based on the above findings.

Accordingly, a main object of the present invention is to provide a powder coating composition having a good storage stability. Another object of this invention is to provide a low temperature thermosetting powder coating composition which does not cause any environmental pollution and can afford a coating film of good surface condition. These and other objects of the invention will be apparent to those skilled in the art from the foregoing and subsequent description.

Figure 2:
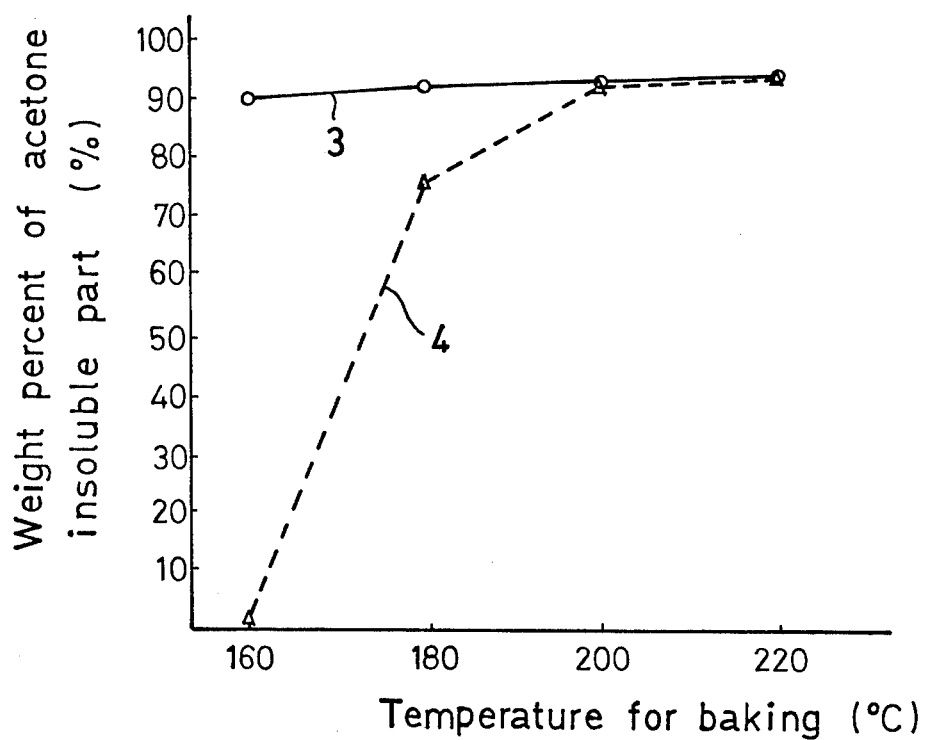

The above objectives may be seen with reference to the drawings wherein:

FIG. 1 represents a plot of weight percent of acetone insoluble portion against baking temperature for the products of Example 2–3 and FIG. 2 represents a plot of weight percent of acetone insoluble portion vs. baking temperature for the product of Example 5–2.

According to the present invention, there is provided a powder coating composition which comprises (A) a solid resin and (B) a polyisocyanate compound having an average of two or more free isocyanate groups per molecule.

The solid resin (A) may be classified into (C) a solid resin having an active hydrogen atom as in a hydroxyl group or a primary or secondary amino group which can react with an isocyanate group and (D) a solid resin having no active hydrogen atom as above.

In order to assure a good storage stability of the powders of a composition comprising the solid resin (A) and the polyisocyanate compound (B) without any depression of the thermal fluidity, it is preferable to make the proportion of the components (A) and (B) being 99 : 1 to 30 : 70 by weight. When the amount of the component (B) is less than 1% by weight, the effect on the storage stability is markedly decreased. When the amount of the component (B) is more than 70% by weight, the thermal fluidity becomes inferior and a smooth coating film can be difficulty obtained by the use of the resulting composition.

In case of solid resin (C) being employed as a part or whole of the component (A), the components (B) and (C) may be preferably used in a proportion of 0.2 to 2 mol of the isocyanate group in the former to 1 mol of the active hydrogen atom in the latter.

As the component (A), there may be exemplified acrylic resins, polyester resins, acryl-modified polyester resins, epoxy resins, polyether resins, amino resins, vinyl chloride resins, polyamide resins, polybutadiene, petroleum resins, etc. The use of one having a glass transition temperature of not lower than about 5° C, particularly of about 5° to 150° C, is preferred (the glass transition temperature being measured according to the balance method).

As the component (C), one having a number average molcular weight of about 400 to 30,000 and a glass transition temperature of about 5° to 80° C is favored.

The powder coating composition of the invention shows a good storage stability. When applied to a substrate and baked, it exhibits a good thermal fluidity. In case of a part or whole of the component (A) being the component (C), a coating film having excellent properties can be formed on baking.

The component (B) is required to be approximately selected depending on the kind and the glass transition temperature of the component (A) so as to have good compatibility with the component (A) on melting and also not to impart any sticking property to the resulting powder composition with the component (A). When the glass transition temperature of the component (A) is lower than about 5° C, the obtained composition is often sticky and hardly pulverized at room temperature. Further, in case of the component (C) being used as a part or whole of the component (A), the one having a glass transition temperature higher than about 80° C shows an inferior thermal fluidity under usual baking conditions and may not afford any smooth coating film.

Specific examples of the acrylic resin to be used as the component (A) are the polymers obtained by polymerization of one or more kinds of unsaturated hydroxyl monomers (e.g. 2-hydroxyethyl methacrylate, 2-hydroxypropyl methacrylate, 2-hydroxyethyl acrylate), unsaturated acid amide monomers (e.g. acrylamide, N-methylolacrylamide, methacrylamide), unsaturated carboxylic acid monomers (e.g. acrylic acid, methacrylic acid, itaconic acid, crotonic acid), unsaturated acid anhydride monomers (e.g. itaconic anhydride, maleic anhydride), unsaturated glycidyl monomers (e.g. glycidyl acrylate, glycidyl methacrylate), acrylic esters (e.g. ethyl acrylate, n-butyl acrylate, 2-ethylhexyl acrylate), methacrylic esters (e.g. methyl methacrylate, n-lauryl methacrylate, isobutyl methacrylate), maleic esters (e.g. dibutyl maleate, diethyl maleate), fumaric esters (e.g. dibutyl fumarate, diethyl fumarate), styrene and its derivtives (e.g. α-methylstyrene, β-chlorostyrene, α-bromostyrene, p-bromostyrene), nitriles (e.g. acrylonitrile, methylacrylonitrile, ethylacrylonitrile) and the like.

Among these acrylic resins, there may be used preferably ones having a number average molecular weight of about 1,000 to 30,000 and an active hydrogen atom content of about $1 \times 10^{-4}$ to $30 \times 10^{-4}$ mol/g. When the number average molecular weight is less than about 1,000 or the active hydrogen atom content is less than about $1 \times 10^{-4}$ mol/g, sufficient cross linking does not take place in the coating film made of a composition using such acrylic resin and the thus formed coating film does not exhibit good physical properties. When the number average molecular weight is more than about 30,000, the thermal fluidity of the coating film becomes inferior. In case of the active hydrogen atom content being more than about $30 \times 10^{-4}$ mol/g, the cross linking proceeds excessively so that the surface condition of the coating film is marked deteriorated.

Specific examples of the polyester resin are the reaction products of one or more kinds of polycarboxylic acids such as saturated aliphatic carboxylic acids (e.g. oxalic acid, succinic acid, glutaric acid, adipic acid, pimelic acid, suberic acid, sebacic acid, isosebacic acid) and aromatic carboxylic acids (e.g. phthalic acid, isophthalic acid, terephthalic acid) and their anhydrides and one or more kinds of polyhydric alcohols such as ethyleneglycol, 1,2-propyleneglycol, 1,3-propyleneglycol, diethyleneglycol, triethyleneglycol, 1,4-butanediol, 2,3-butanediol, 1,5-pentanediol, 1,4-pentanediol, 1,6-hexanediol, 1,5-hexanediol, 1,4-hexanediol, 1,3-hexanediol, 2,3-hexanediol, 2,4-hexanediol, 2,5-hexanediol, 3,4-hexanediol, 1,7-heptanediol, 1,6-heptanediol, 1,5-heptanediol, 1,4-heptanediol, 1,3-heptanediol, 2,3-heptanediol, 2,4-heptanediol, 2,5-heptanediol, 2,2-dimethyl-1,3-propanediol (neopentyl glycol), 2,2-diethyl-1,3-propanediol, 2-ethyl-2-butyl-1,3-propanediol, 2,4-cyclohexanedimethylol, trimethylolpropane and glycerol.

When desired, the polyester resin may be modified by the use of a conventional modifier such as an unsaturated aliphatic carboxylic acid (e.g. maleic acid, fumaric acid, itaconic acid, citraconic acid, linoleic acid) or its anhydride (e.g. maleic anhydride), a higher unsaturated aliphatic carboxylic acid, a natural oil or fat (e.g. linseed oil, sardine oil, dehydrated castor oil, safflower oil, soybean oil, cotton seed oil, castor oil, palm oil), a synthetic oil or fat, a fatty acid obtained from the hydrolyzate of said oil or fat or the like.

Among the polyester resins, the use of ones having a number average molecular weight of about 500 to 5,000 and a hydroxyl group content of about $3 \times 10^{-4}$ to $45 \times 10^{-4}$ mol/g is favored. When the number average molecular weight is less than about 500 or the hydroxyl group content is less than about $3 \times 10^{-4}$ mol/g, the cross linking of the coating film is not sufficient and the physical properties are not good. When the number average molecular weight is more than about 5,000, the thermal fluidity is inferior. In case of the hydroxyl group content being higher than about $45 \times 10^{-4}$ mol/g, the surface condition of the coating film is not good.

The acrylic-modified polyester resin may be one obtained by grafting an ethylenically unsaturated monomer and/or an acrylic resin on the said polyester resin in a conventional manner utilizing polymerization, condensation, addition, chain transfer reaction and/or the like. Among such acrylic-modified polyester resins, preferred is the one having a number average molecular weight of about 500 to 20,000 and an active hydrogen atom content of about $3 \times 10^{-4}$ to $45 \times 10^{-4}$ mol/g. When the number average molecular weight and the active hydrogen atom content are within the said ranges, the formtion of a coating film being advantageously cross linked and having favorable physical properties is assured.

As the epoxy resin, there may be exemplified a polycondensate of bisphenol A and epichlorohydrin, a polyfuncational epoxy compound obtained by the condensation of novolak with epichlorohydrin, an epoxy compound having a polyether chain, an alicyclic epoxy compound, etc. Examples of the amino resin are urea resins, melamine resins, guanamine resins, etc. Examples of the polyether resins include the addition products of alkylene oxides (e.g. ethylene oxide, propylene oxide) and low molecular polyols (e.g. ethyleneglycol, glycerol, trimethylolpropane, pentaerythritol). In order to produce advantageously an isocyanate cross linking type resin composition, there may be favorably employed an epoxy resin having a number average molecular weight of about 400 to 4,000 or a polyether resin having a number averge molecular weight of about 500 to 3,000. These resins may be used in such an amount of not less than 5 in the total of the number of hydroxyl groups in one molecule of the resins and the number of free isocyanate groups in one molecule of the polyisocyanate compound. In case of the amino resin, the use of one having a number average molecular weight of about 400 to 2,000 in an amount of not less than 5 in the total of the number of primary and secondary amino groups and hydroxyl groups in one molecule of the resin and the number of free isocyanate groups in one molecule of the polyisocyanate compound is favorable.

Illustrating the component (B), i.e. the polyisocyanate compound having a free isocyanate group, it is preferred to be in a solid state at room temperature (e.g. 5° to 30° C) for preventing the reaction between the free isocyanate group and the active hydrogen atom in the solid resin, component (A).

The said polyisocyanate compound may be obtained by converting a polyisocyanate such as a diisocyanate or a triisocyanate (e.g. hexamethylene diisocyanate, ethylene diisocyanate, propylene diisocyanate, tetramethylene diisocyanate, decamethylene diisocyanate, triphenylmethane triisocyanate, 4,4'-ethylene-biscyclohexyl isocyanate, 4,4'-methylene-biscyclohexyl isocyanate, ω,ω-diisocyanato-1,3-dimethylbenzene, phenylene diisocyanate, lysine diisocyanate methyl ester, isophorone diisocyanate, trimethylhexamethylene diisocyanate, diphenylmethane-4,4'-diisocyanate, 3,3'-dimethyldiphenylmethane-4,4'-diisocyanate) into a biuret structure or an allophanate structure. The polyisocyanate compound may be also obtained by reacting one or more of the said polyisocyanates and/or the said biuret or allophanate structure polyisocyanate compounds with one or more of chain extenders to give one having an average of two or more free isocyanate groups per molecule. Examples of the chain extender are polyhydric alcohols and polycarboxylic acids as used in the production of the said polyester resin, substituted and unsubstituted diamines (e.g. ethylenediamine, tetramethylenediamine, pentamethylenediamine, hexamethylenediamine, octamethylenediamine, decamethylenediamine, p-xylylenediamine, N,N'-diisobutylhexamethylenediamine, N,N'-diethylhexamethylenediamine, N-isobutylhexamethylenediamine, N-benzylhexamethylenediamine), water and amino alcohols, etc.

Among the polyisocyanate compounds, preferred is the one prepared by reacting the said reactants in an equivalent ratio of the free isocyanate group to the active hydrogen atom in the chain extender being more than 1 (favorably not less than 1.5 and not more than 10) in the presence or absence of an inert solvent (e.g. butyl acetate, toluene, methylethylketone) with or without a suitable basic or metal catalyst (e.g. triethylamine, N-methylmorpholine, dibutyl tin dilaurate, stannous chloride) at a temperature from room temperature to 200° C (favorably from 50° to 160° C). When the chain extender contains a large amount of impurities, by-products are yielded and the physical properties of the coating film as ultimately formed are considerably deteriorated. Because of this reason, the chain extender is favored to be previously purified by a conventional procedure such as distillation, extraction or adsorption.

The thus obtained reaction product may contain in some cases unreacted polyisocyanates and/or oligomers and can be used as such or after elimination of the unreacted polyisocyanates and the oligomers by a conventional procedure such as distillation, extraction or adsorption. When purified as above, the resulting product may be used alone or in combination.

The powder coating composition comprising the components (A) and (B) according to this invention may be used for the manufacture of a sheet, a film, an artificial leather, etc., but it is particularly and extremely useful as a powdery painting composition. Thus, it may be used as a powdery paint as such or in admixture with one or more additives conventionally employed in the field of paint industry. Examples of the additives are reactive compounds (e.g. aromatic polyamines, aliphatic polyamines, polycarboxylic acids and their anhydrides, polycarboxylic acid hydrazides, dicyandiamide, $BF_3$-amine complex compounds, totally blocked cyanate compounds), pigments (e.g. $TiO_2$, FeO, silica, $CaCO_3$, $BaSO_4$, carbon black, phthalocyanine blue), plasticizers (e.g. dibutyl phthalate, dioctyl phthalate), cellulose derivatives (e.g. cellulose acetate butyrate, methoxycellulose, ethoxycellulose), anioic surface active agents (e.g. aliphatic acid salts, higher alcohol sulfates), nonionic surface active agents (e.g. polyoxyethylene alkyl ether), cationic surface active agents (e.g. alkylamine salts, quaternary ammonium salts), leveling agents (e.g. silicon resin, acrylic resin), low temperature cross linking catalysts (e.g. triethylamine, dibutyl tin dilaurate), etc.

The powder coating composition of this invention may be uniformly blended by a conventional process such as dry blend process, semi-dry blend process or melt blend process to give a uniform blend dispersion. The uniform blend dispersion is then pulverized to form a powdery paint.

The powdery paint may be applied on a suitable substrate to be coated by a conventional coating process such as an electrostatic coating process or a fluidized bed coating process, followed by baking, usually at a temperature from 140° to 240° C for a period of 5 to 60 minutes to form a good coating film. In case of the isocyanate cross linking type resin composition, baking at a relatively low temperature, e.g. below 200° C, can afford an urethane resin having an excellent surface condition. Since any blocking agent is not released at the baking, no environmental pollution is caused by the use of the composition as a paint.

Practical and presently preferred embodiments of the invention are illustratively shown in the following Examples wherein parts and % are by weight.

EXAMPLE 1

(1-1) Preparation of the polyisocyanate compound:

In a flask equipped with a reflux condenser, a thermometer, a nitrogen inlet and an agitator, there are charged isophorone diisocyanate (444.4 parts) and ethylene glycol (62 parts). After replacement of the atmosphere by nitrogen gas, the reaction is carried out at 90° to 100° C for 24 hours. The product is a colorless, transparent solid at room temperature, of which the free isocyanate group content is $39.5 \times 10^{-4}$ mol/g.

(1-2) Preparation of the paint composition:

To a mixture of acrylic resin (consisting of methyl methacrylate, styrene, isobutyl methacrylate, n-butyl methacrylate, glycidyl methacrylate and 2-hydroxyethyl methacrylate; glycidyl group content, $10.6 \times 10^{-4}$ mol/g; hydroxyl group content, $2 \times 10^{-4}$ mol/g; number average molecular weight, 6,000; glass transition temperature, 50° C) (350 parts), sebacic acid (37.5 parts), rutile type titanium oxide (100 parts) and a flow control agent ("Modaflow" manufactured by Monsanto Co., Ltd.) (5 parts), the polyisocyanate compound prepared in the above (1-1) (25 parts) is added, and the resultant mixture is melt blended by the aid of an extruder, pulverized by the use of a powdering machine and passed through a 100 mesh screen to obtain a powdery paint (hereinafter referred to as "1-A").

For comparison, a mixture of the said acrylic resin, sebacic acid, rutile type titanium oxide and "Modaflow" is treated in the same manner as above to obtain a powdery paint (hereinafter referred to as "1-B").

(1-3) Test:

The powdery paints "1-A" and "1-B" are applied on iron plates by the use of an electrostatic applicator and baked at 200° C for 30 minutes. The results of the test on the coating films are shown in Table 1. After being stored at 40° C for 7 days, the powdery paint "1-B" produces marked sticking and blocking and is not suitable for the practical use, while the powdery paint "1-A" does not produce any change and can be used to afford a coating film having the substantially same properties as those of the coating film formed by one before storage.

Table 1

| Powdery paint | 1-A | 1-B | |
|---|---|---|---|
| Test period Test item | Immediately after preparation | Immediately after preparation | Remarks |
| Gloss | 89 % | 90 % | 60° mirror reflection |
| Smoothness | Good | Good | |
| Impact resistance | 20 cm | 20 cm | Du Pont's impact resistance tester; falling distance of plumb (500 g; ½") |
| Hardness | 35 | 34 | Sword-Rocker value; glass plate 58; polymethyl methacrylate plate 23 |

EXAMPLE 2

(2-1) Preparation of the blocked polyisocyanate compound:

The polyisocyanate compound obtained in Example 1 (1-1) (253.2 parts) and phenol (94 parts) are reacted at 130° to 140° C for about 3 to 8 hours. When the free isocyanate group is completely blocked, the temperature is lowered. The product is a yellowish brown, transparent solid at room temperature.

(2-2) Preparation of the paint composition:

A mixture of the polyisocyanate compound prepared in the above (1-1) (155 parts) and a polyester resin (consisting of isophthalic acid, neopentyl glycol and glycerol; hydroxyl group content, $17.7 \times 10^{-4}$ mol/g; number average molecular weight, 1,200; glass transition temperature, 50° C) (345 parts) is melt blended in an extruder and pulverized by the use of a powdering machine. Passing the powders through a 100 mesh screen, there is obtained a powdery paint (hereinafter referred to as ("2-A").

Separately, rutile type titanium oxide (200 parts) is added to the mixture as above, and the resultant mixture is melt blended and pulverized to give a powdery paint (hereinafter referred to as ("2-B").

For comparison, a mixture of the blocked polyisocyanate compound prepared in the above (2-1) (190 parts) and the polyester resin as above (310 parts) is similarly processed to obtain a powdery paint (hereinafter referred to as ("2-C").

Separately, rutile type titanium oxide (200 parts) is added to the mixture as above, and the resultant mixture is melt blended and pulverized to give a powdery paint (hereinafter referred to as ("2-D").

(2-3) Test:

The powdery paints "2-A" and "2-C" are applied on tin plates by the use of an electrostatic applicator and baked at 160° C, 180° C, 200° C or 220° C for 30 minutes. The produced coating films are extracted with acetone for 5 hours by the use of a Soxhlet extractor, and the weight percentages of the insoluble material as measured are plotted in a graph to make FIG. 1 of the accompanying drawings wherein the lines 1 and 2 are respectively for the powdery paints "2-A" and "2-C". From FIG. 1, it can be seen that the coating composition obtained by this invention can be cured at a lower temperature than the coating composition for comparison.

The powdery paints "-2-B" and "2-D" are applied on iron plates by the use of an electrostatic applicator and baked at 180° C for 30 minutes and at 200° C for 30 minutes, respectively. Besides, the powdery paint "2-B" after stored at room temperature for 6 months is applied on an iron plate under the same conditions as above and then baked. The results of the test on the coating films are shown in Table 2.

Table 2

| Powdery paint | 2-B Immediately | 2-B After | 2-D Immediately | |
|---|---|---|---|---|
| Test period Test item | after preparation | 6 months storage | after preparation | Remarks |
| Gloss | 91 % | 88 % | 90 % | 60° mirror reflection |
| Pinhole | None | None | Many | |
| Discloration | None | None | Remarkably yellowing | |
| Impact resis- | 25 cm | 25 cm | 25 cm | Du Pont's impact resistance tester; fal- |

Table 2-continued

| Powdery paint Test item | Immediately after preparation | 2-B After 6 months storage | 2-D Immediately after preparation | Remarks |
|---|---|---|---|---|
| tance | | | | ling distance of plumb (500 g; 1") |
| Hardness | 36 | 35 | 35 | Sword-Rocker value; glass plate 58; polymethyl methacrylate plate 23 |
| Insoluble part in acetone | 95.0 | 92.0 | 93.5 | Weight percentage of insoluble materials (%) |

As understood from Table 2, the coating composition of the invention shows a good storage stability, and the coating film formed thereby is excellent in gloss and resistance to discoloration and has no pinhole.

EXAMPLE 3

(3-1) Preparation of the polyisocyanate compound:

Lysine diisocyanate methyl ester (212 parts) and purified bisphenol A (114 parts) are charged in a flask, and the reaction is carried out under the same conditions as in Example 1. The product is a pale yellow, transparent resin at room temperature and has a free isocyanate group content of $30.7 \times 10^{-4}$ mol/g.

(3-2) Preparation of the paint composition:

As in Example 2, the polyisocyanate compound obtained in the above (3-1) (183.5 parts), the polyester resin as in Example 2 (316.5 parts) and rutile type titanium oxide (175 parts) are processed to make a powdery paint.

(3-3) Test:

The powdery paint obtained in the above (3-2) is applied on an iron plate by the use of an electrostatic applicator and baked at 180° C for 30 minutes to give an elastic coating film having no pinhole and being excellent in gloss. The results of the test on the coating film are shown in Table 3.

Table 3

| Test item | Test period Immediately after preparation | After 3 months storage |
|---|---|---|
| Gloss | 86 % | 87 % |
| Pinhole | None | None |
| Discoloration | None | None |
| Impact resistance | 25 cm | 25 cm |
| Hardness | 34 | 34 |
| Insoluble part in acetone | 88.0 % | 87.5 % |

Note:
Tested as in Example 2.

EXAMPLE 4

(4-1) Preparation of the polyisocyanate compound:

Diphenylmethane-4,4'-diisocyanate (250.2 parts), purified ethyleneglycol (31 parts) and butyl acetate (281.2 parts) are charged in a flask, the atmosphere is replaced by nitrogen gas and the reaction is carried out at 100° to 120° C for 24 hours. By removal of the butyl acetate from the reaction mixture under reduced pressure, there is obtained a white powdery solid having a free isocyanate group content of $35.6 \times 10^{-4}$ mol/g.

(4-2) Preparation of the paint composition:

As in Example 2, the polyisocyanate compound obtained in the above (4-1) (166.5 parts), the polyester resin as in Example 2 (333.5 parts) and rutile type titanium oxide (175 parts) are processed to make a powdery paint.

(4-3) Test:

The powdery paint obtained in the above (4-2) is applied on an iron plate by the use of an electrostatic applicator and baked at 180° C for 30 minutes to give an elastic coating film having no pinhole and excellent in gloss and coloring resistance. Even after storage for period of 3 months at room temperature, the powdery paint can afford a good coating film.

EXAMPLE 5

(5-1) preparation of the paint composition:

As in Example 1, the polyisocyanate compound obtained in Example 1 (126.6 parts) and acrylic resin (consisting of methyl methacrylate, styrene, n-butyl acrylate and 2-hydroxyethyl methacrylate; hydroxyl group content, $12.5 \times 10^{-4}$ mol/g; number average molecular weight, 5,000; glass transition temperature, 55° C) (400 parts) are processed to make a powdery paint (hereinafter referred to as ("5-A").

Separately, rutile type titanium oxide (131.6 parts) is added to the mixture as above, and the resultant mixture is melt blended and pulverized to give a powdery paint (hereinafter referred to as ("5-B").

For comparison, a mixture of the blocked polyisocyanate compound prepared in Example 2, (2-1) (173.6 parts) and the acrylic resin as above (400 parts) is similarly processed to obtain a powdery paint (hereinafter referred to as "5-C").

Separately, rutile type titanium oxide (131.6 parts) is added to the mixture as above, and the resultant mixture is melt blended and pulverized to give a powdery paint (hereinafter referred to as "5-D").

(5-2) Test:

The powdery paints "5-A" and "5-C" are applied on tin plates by the use of an electrostatic appicator and baked at 160° C, 180° C, 200° C or 220° C for 30 minutes. The produced coating films are extracted with acetone for 5 hours by the use of a Soxhlet extractor, and the weight percentages of the insoluble material as measured are plotted on a graph to make FIG. 2 of the accompanying drawings wherein the lines 3 and 4 are respectively for the powdery paints "5-A" and "5-C". From FIG. 2, it can be seen that the coating composition of this invention can be cured at a lower temperature than the coating composition for comparison.

The powdery paints "5-B" and "5-D" are applied on iron plates by the use of an electrostatic applicator and baked at 180° C for 30 minutes and at 200° C for 30 minutes, respectively. Besides, the powdery paint "5-B" after stored at room temperature for 3 months is applied on an iron plate under the same conditions as above and then baked at 180° C for 30 minutes. The results of the test on the coating films are shown in Table 4.

Table 4

| Powdery paint Test period Test item | 4-B Immediately after preparation | 4-B After 3 months storage | 4-D Immediately after preparation |
|---|---|---|---|
| Gloss | 86 % | 84 % | 86 % |
| Pinhole | None | None | Many |
| Discoloration | None | None | Remarkably yellowing |
| Impact resistance | 20 cm | 25 cm | 20 cm |
| Hardness | 34 | 35 | 34 |
| Insoluble part in | 92.1 % | 92.7 % | 92.1 % |

Table 4-continued

| Powedery paint Test period Test item | 4-B Immediately after preparation | 4-B After 3 months storage | 4-D Immediately after preparation |
|---|---|---|---|
| acetone | | | |

Note:
Tested as in Example 2.

What is claimed is:

1. A substantially non-sticky, melt blended, thermosetting powder coating composition in the dry state which comprises at least one solid resin having a glass transition temperature of from 5° to 150° C and an OH content of $1 \times 10^{-4}$ to $45 \times 10^{-4}$ g equivalent/g, the OH group liberating an active hydrogen atom, and at least one polyisocyanate compound which is solid at room temperature and having at least two isocyanate groups in each molecule in an average weight ratio of about 99 : 1 to 30 : 70 and a molar proportion of the active hydrogen in the former to the isocyanate group in the latter of 1 : 0.2 − 2.

2. The powder coating composition according to claim 1, wherein the polyisocyanate compound is an addition product of a diisocyanate or triisocyanate and a chain extender having two or more active hydrogen atoms.

3. The powder coating composition according to claim 1, wherein the polyisocyanate compound is a biuret or allophanate structure polyisocyanate compound derived from a diisocyanate or triisocyanate.

4. The powder coating composition according to claim 1, wherein the polyisocyanate compound is an addition product of a biuret or allophanate structure polyisocyanate compound derived from a diisocyanate or triisocyanate and a chain extender having two or more active hydrogen atoms.

5. The powder coating composition according to claim 1, wherein the polyisocyanate compound is the reaction product obtained by reacting a diisocyanate or triisocyanate or a biuret or allophanate structure polyisocyanate compound derived therefrom with a chain extender having two or more active hydrogen atoms in an equivalent ratio of the free isocyanate group in the former to the active hydrogen atom in the latter being more than 1.

6. The powder coating composition according to claim 5, wherein the equivalent ratio of the free isocyanate group to the active hydrogen atom is from 1.5 : 1 to 10 : 1.

7. The powder coating composition according to claim 1, wherein the solid resin is an acrylic resin having a number average molecular weight of 1,000 to 30,000 and an active hydrogen atom content of $1 \times 10^{-4}$ to $30 \times 10^{-4}$ mol equivalent/g.

8. The powder coating composition according to claim 1, wherein the solid resin is a polyester resin having a number average molecular weight of 500 to 5,000 and an active hydrogen atom content of $3 \times 10^{-4}$ to $45 \times 10^{-4}$ mol equivalent/g.

9. The powder coating composition according to claim 1, wherein the solid resin is an acryl-modified polyester resin having a number average molecular weight of 500 to 20,000 and an active hydrogen atom content of $3 \times 10^{-4}$ to $45 \times 10^{-4}$ mol equivalent/g.

10. The powder coating composition according to claim 1, wherein the solid resin is an epoxy resin, an amino resin or a polyether resin.

* * * * *